United States Patent
Gerbarg et al.

(10) Patent No.: US 10,606,611 B2
(45) Date of Patent: Mar. 31, 2020

(54) TECHNIQUES FOR PERFORMING DYNAMIC LINKING

(71) Applicant: Apple Inc., Cupertino, CA (US)

(72) Inventors: Louis G. Gerbarg, San Francisco, CA (US); Dallas Blake De Atley, San Francisco, CA (US); Nick Kledzik, Cupertino, CA (US); Peter Cooper, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/817,103

(22) Filed: Nov. 17, 2017

(65) Prior Publication Data

US 2018/0349156 A1    Dec. 6, 2018

Related U.S. Application Data

(60) Provisional application No. 62/514,735, filed on Jun. 2, 2017.

(51) Int. Cl.
*G06F 9/445*      (2018.01)
*G06F 16/172*    (2019.01)
*G06F 8/60*        (2018.01)

(52) U.S. Cl.
CPC ........ *G06F 9/44521* (2013.01); *G06F 16/172* (2019.01); *G06F 8/60* (2013.01)

(58) Field of Classification Search
CPC .. G06F 8/60; G06F 9/44521; G06F 17/30132; G06F 8/54; G06F 8/65; G06F 8/71; G06F 9/445; G06F 9/45537; G06F 17/30286; G06F 17/30575; H04L 9/3236; H04L 9/3247; H04L 67/34; H04L 67/06; H04N 21/235; H04N 21/435; H04N 21/812; H04N 21/8173; H04N 21/8456; Y10S 707/922; Y10S 707/99952
See application file for complete search history.

(56) References Cited

U.S. PATENT DOCUMENTS 5,475,840 A    12/1995 Nelson et al.
5,659,751 A    8/1997 Heninger
(Continued)

*Primary Examiner* — Wei Y Zhen
*Assistant Examiner* — Mohammed N Huda
(74) *Attorney, Agent, or Firm* — Jaffery Watson Mendonsa & Hamilton LLP

(57) ABSTRACT

Disclosed herein are techniques for performing dynamic linking at a computing device. According to some embodiments, the techniques can involve receiving a request to perform a dynamic linking of a software application. The request can be issued in conjunction with installing the software application, launching the software application for a first time, and so on. In response to the request, a closure file can be generated based on different properties associated with the software application (e.g., environment variables, object files, etc.). Notably, the closure file is generated "out-of-process" relative to the execution environment of the software application. Additionally, the techniques can involve caching the closure file such that the closure file is accessible to the software application. In turn, the software application can utilize the closure file at launch/execution times to reduce a number of dynamic linking operations that otherwise are required to take place using conventional approaches.

20 Claims, 7 Drawing Sheets

(56) References Cited

U.S. PATENT DOCUMENTS

| | | | |
|---|---|---|---|
| 5,835,749 A * | 11/1998 | Cobb | G06F 9/44521 |
| | | | 719/331 |
| 5,838,916 A * | 11/1998 | Domenikos et al. | G06F 9/445 |
| | | | 709/219 |
| 5,916,308 A | 6/1999 | Duncan et al. | |
| 7,930,709 B2 | 4/2011 | Relyea | |
| 2006/0080682 A1 | 4/2006 | Anwar et al. | |
| 2011/0035742 A1 * | 2/2011 | Shenfield | G06F 9/44521 |
| | | | 717/171 |

* cited by examiner

Closure File: JSON
Representation 210-1

```
{
  "cd-hash": "e477fa1e404d07fa969472eff8a5b465fd2aa045",
  "dyld-cache-uuid": "A1DEBAB9-F257-3AF1-BC81-32BA41BEE05C",
  "group-num": "2",
  "images": [
    {
      "code-sign-location": {
        "offset": "0x71F0",
        "size": "0x2530"
      },
      "dependents": [
        {
          "link": "regular",
          "path": "/usr/lib/libutil.dylib"
        },
        {
          "link": "regular",
          "path": "/usr/lib/libncurses.5.4.dylib"
        },
        {
          "link": "regular",
          "path": "/usr/lib/libSystem.B.dylib"
        }
      ],
      "file-inode": "0x924A243",
      "file-mod-time": "0x5922B0C7",
      "fixups": [
        {
          "segment-2": {
            "0x00000": "64-bit bind, target={cache+0x36724BD0}",
            "0x00008": "64-bit bind, target={cache+0x36723070}",
            ...
            "0x004A0": "64-bit rebase",
            "0x004E0": "64-bit rebase"
          }
        }
      ],
      ...
```

*FIG. 2B*

Closure File: JSON
Representation 210-2

...
```
      "has-objc": "false",
      "has-weak-defs": "false",
      "initializer-order": [
        "/usr/lib/libc++.1.dylib",
        "/usr/lib/system/libdispatch.dylib",
        "/usr/lib/system/libsystem_trace.dylib",
        "/usr/lib/system/libxpc.dylib",
        "/usr/lib/libSystem.B.dylib",
        "/usr/lib/system/libsystem_platform.dylib",
        "/usr/lib/system/libsystem_malloc.dylib",
        "/usr/lib/system/libsystem_c.dylib",
        "/usr/lib/system/libsystem_pthread.dylib",
        "/usr/lib/system/libsystem_blocks.dylib",
        "/usr/lib/system/libsystem_kernel.dylib",
        "/usr/lib/system/libsystem_sandbox.dylib",
        "/usr/lib/system/libcommonCrypto.dylib",
        "/usr/lib/system/libunwind.dylib",
        "/usr/lib/system/libsystem_m.dylib",
        "/usr/lib/system/liblaunch.dylib",
        "/usr/lib/system/libmacho.dylib",
        "/usr/lib/system/libsystem_asl.dylib",
        "/usr/lib/system/libsystem_info.dylib",
        "/usr/lib/system/libsystem_notify.dylib",
        "/usr/lib/system/libcorecrypto.dylib",
        "/usr/lib/libobjc.A.dylib"
      ],
      "mappings": [
        {
          "file-offset": "0x0",
          "file-size": "0x0",
          "permissions": "0x0",
          "vm-size": "0x100000000"
        },
    ...
```

*FIG. 2C*

Closure File: JSON
Representation 210-3

```
...
{
      "file-offset": "0x0",
      "file-size": "0x5000",
      "permissions": "0x5",
      "vm-size": "0x5000"
    },
    {
      "file-offset": "0x5000",
      "file-size": "0x1000",
      "permissions": "0x3",
      "vm-size": "0x1000"
    },
    {
      "file-offset": "0x6000",
      "file-size": "0x4000",
      "permissions": "0x1",
      "vm-size": "0x4000"
    }
   ],
   "never-unload": "true",
   "path": "/bin/ls",
   "platform-binary": "false",
   "total-vm-size": "0xA000",
   "uuid": "BDFAAB38-B160-30D2-8549-B94AFD2F1B1F"
  }
 ],
 "initial-image-count": "41",
 "libdyld-entry-offset": "0x83E59B0",
 "library-validation": "false",
 "restricted": "false",
 "root-images": [
   "BDFAAB38-B160-30D2-8549-B94AFD2F1B1F"
 ],
 "start-offset": "0x1200"
}
```

*FIG. 2D*

TECHNIQUES FOR PERFORMING DYNAMIC LINKING

CROSS-REFERENCE TO RELATED APPLICATIONS

The present application claims the benefit of U.S. Provisional Application No. 62/514,735, entitled "TECHNIQUES FOR PERFORMING DYNAMIC LINKING," filed Jun. 2, 2017, the content of which is incorporated herein by reference in its entirety for all purposes.

FIELD OF INVENTION

The embodiments described herein set forth techniques for performing dynamic linking for software applications at a computing device.

BACKGROUND

When a software application is compiled, the various libraries relied upon by the software application can be statically or dynamically linked to the resulting (i.e., executable) software program. In particular, static linking involves incorporating, into the executable software application, the portions of the libraries relied upon by the software application. Notably, while static linking can improve launch time latencies (relative to dynamic linking, described below), this comes at the cost of decreased flexibility. For example, when the libraries relied upon by the software application are updated (e.g., bug fixes), the software application typically needs to be re-complied with the updated libraries to access the benefits of the updated libraries. To address this issue, dynamic linking involves, at compile time, including references to the portions of the libraries relied upon by the software application. In turn, when the software application is executed on a target computing device, the references can be updated to specifically target the portions of the libraries that are stored on the target computing device. In this manner, dynamic linking can provide enhanced flexibility relative to static linking, as the updated libraries can simply be distributed to software applications installed on target machines in lieu of intensive recompiling.

Unfortunately, despite the foregoing benefits of dynamic linking, several disadvantages with this approach continue to persist that have yet to be addressed. For example, with existing dynamic linking approaches, the increased flexibility comes at the cost of increased latency at runtime while dynamic linking takes place for a given software application. Moreover, existing dynamic linking approaches are susceptible to malicious users who can thwart in-place security protocols and trick software applications into executing in unauthorized modes. For example, libraries relied upon by a given software application can be swapped with malicious libraries that can compromise the overall security of the computing device on which the software application executes. As a result, the overall user experience is deteriorated by the reliable launch-time delays and potential security issues.

SUMMARY OF INVENTION

Representative embodiments set forth herein disclose techniques for performing dynamic linking for software applications at a computing device. According to some embodiments, the techniques can involve receiving a request to perform a dynamic linking of a software application. The request can be issued in conjunction with installing the software application, launching the software application for a first time, and so on. In response to the request, a closure file can be generated based on different properties associated with the software application (e.g., environment variables, object files, etc.). Notably, the closure file is generated "out-of-process" relative to the execution environment of the software application. Additionally, the techniques can involve caching the closure file such that the closure file is accessible to the software application. In turn, the software application can utilize the closure file at launch time to reduce a number of dynamic linking operations that otherwise are required to take place using conventional dynamic linking approaches.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 2A-2D illustrate conceptual diagrams of a closure file, according to some embodiments.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

Representative embodiments set forth herein disclose techniques for performing dynamic linking for software applications at a computing device. In particular, the techniques involve performing dynamic linking for a software application at an initial time (e.g., during an installation of the software application, during a first launch of the software application, during an update of the software application, upon a request by a security daemon, etc.), and producing a "closure file" that can be cached in association with the software application. In turn, the closure file can be utilized to reduce launch-time latency of the software application, as a majority of the dynamic linking procedures have already been completed in association with producing the closure file at the initial time. Moreover, utilization of the closure file can provide enhanced overall security through increased isolation from malformed binaries, stricter runtime enforcements, and access to additional security verifications.

A more detailed description of these techniques is provided below in conjunction with FIGS. 1, 2A-2D, and 3-4.

Figure 1:
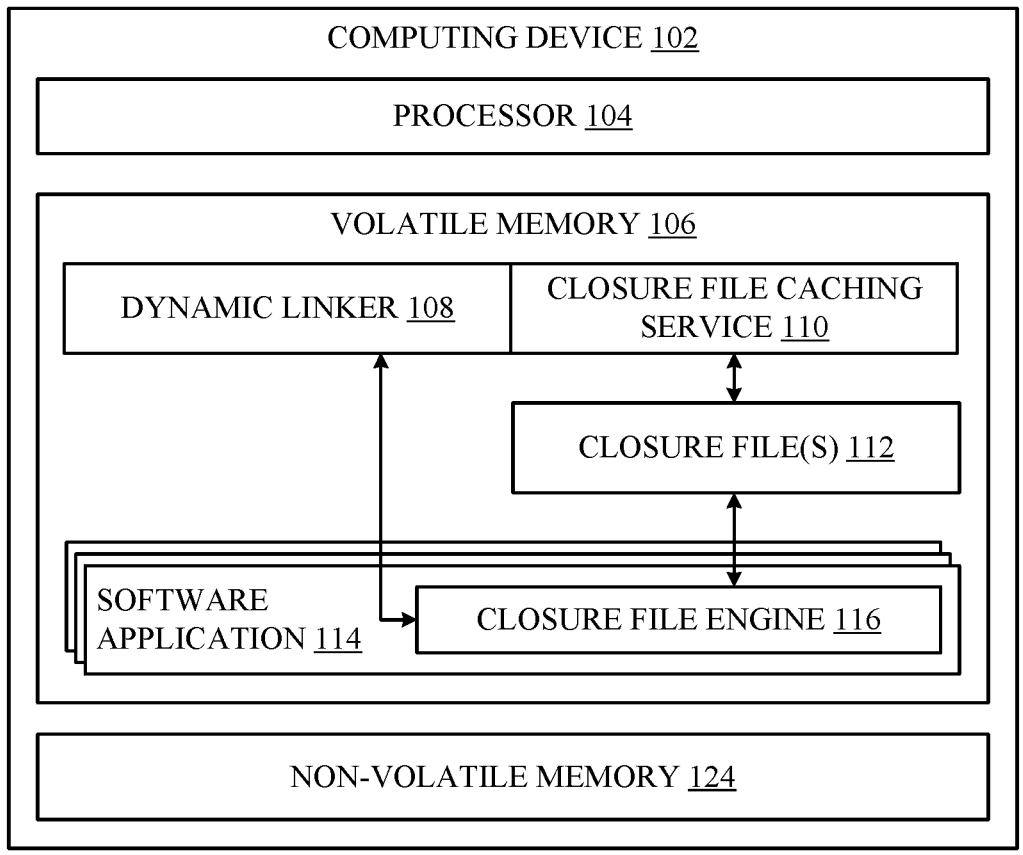
FIG. 1 illustrates an overview of a computing device that can be configured to perform the various techniques described herein, according to some embodiments.
Figure 4:
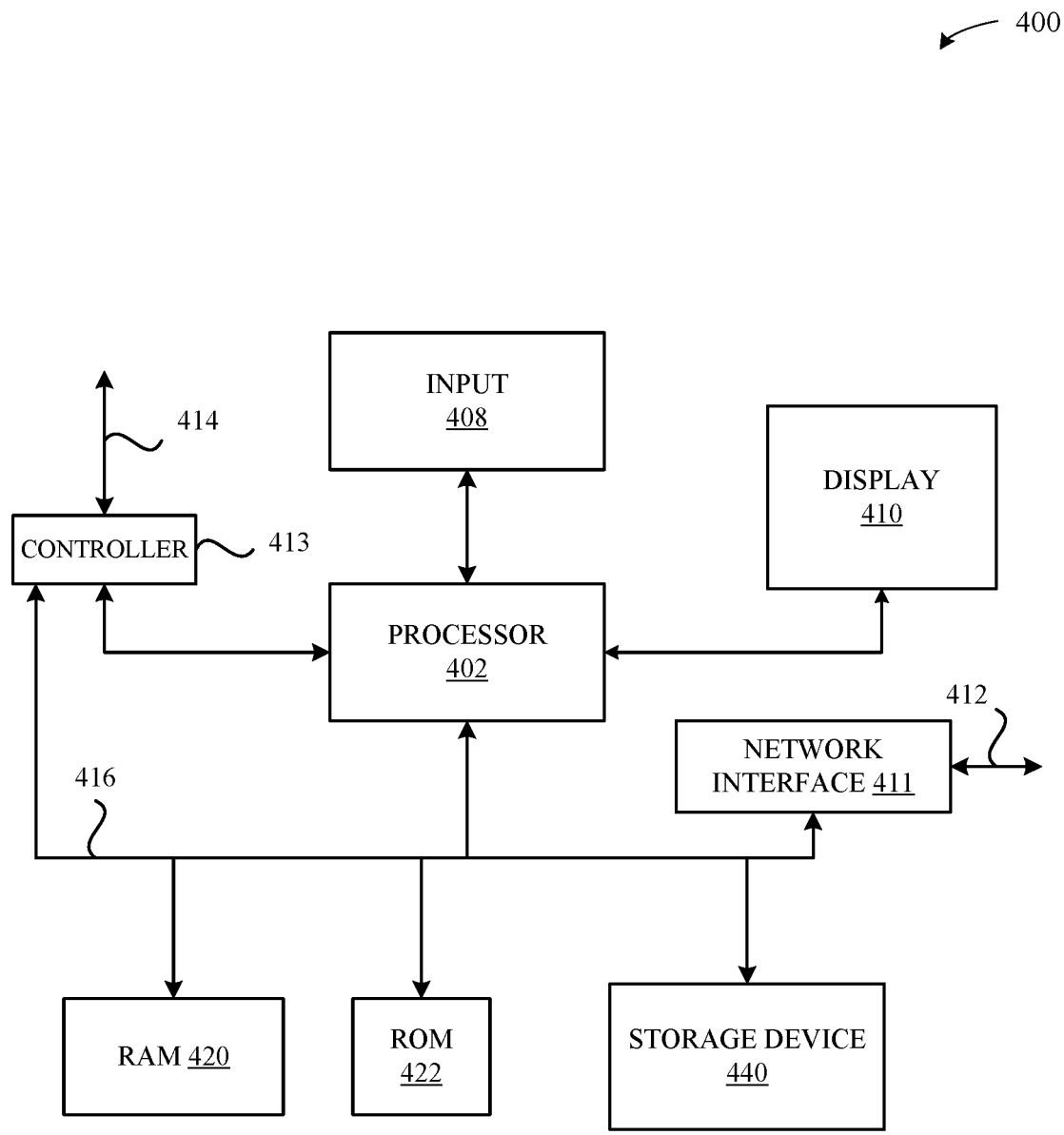
FIG. 4 illustrates a detailed view of a computing device that can be used to implement the various techniques described herein, according to some embodiments.

FIG. 1 illustrates an overview 100 of a computing device 102 that can be configured to perform the various techniques described herein. As shown in FIG. 1, the computing device 102 can include a processor 104, a volatile memory 106, and a non-volatile memory 124. It is noted that a more detailed breakdown of example hardware components that can be included in the computing device 102 is illustrated in FIG. 4, and that these components are omitted from the illustration of FIG. 1 merely for simplification purposes. For example, the computing device 102 can include additional non-volatile memories (e.g., solid state drives, hard drives, etc.), other processors (e.g., a multi-core central processing unit (CPU)), and so on. According to some embodiments, an operating system (OS) (not illustrated in FIG. 1) can be loaded into the volatile memory 106, where the OS can execute a variety of applications that collectively enable the various techniques described herein to be implemented. For example, these applications can include a dynamic linker 108, a closure file caching service 110, and various software applications 114 to execute on the computing device 102.

According to some embodiments, the dynamic linker 108 can be implemented as a daemon that executes separately from the software applications 114 that require dynamic linking. In this regard, a benefit can be achieved in that a standard testing infrastructure (e.g., for debugging) can be utilized in conjunction with the dynamic linker 108, which cannot be implemented using traditional dynamic linkers that execute "in-process"—e.g., during the launch phase of software applications 114. According to some embodiments, the dynamic linker 108 can be configured to generate closure files 112 for different software applications 114 that are configured to execute on the computing device 102. In particular, the dynamic linker 108 can be triggered, under different conditions, to generate a closure file 112 for the software applications 114. For example, for a given software application 114, the dynamic linker 108 can be invoked in conjunction with installing the software application 114 on the computing device 102, launching the software application 114 for a first time on the computing device 102, updating the (already-installed) software application 114 on the computing device 102, and so on. In other examples, the dynamic linker 108 can be invoked in response to different events that occur at the computing device 102, e.g., when the computing device 102 enters into an idle state, when a security daemon on the computing device 102 issues a request to generate a closure file 112 for a software application 114 (e.g., in association with an OS update), and so on. It is noted that the conditions/events are merely exemplary, and that the dynamic linker 108 can be configured to generate closure files 112 in response to or in accordance with any criteria.

In any case, when generating a closure file 112 for a software application 114, the dynamic linker 108 can be configured to perform a variety of operations in an "out-of-process" manner relative to the execution of the software application 114 (e.g., outside of a launch phase). In other words, the dynamic linker 108 can generate the software application 114 outside of the execution environment of the software application 114, while performing at least a subset of the tasks that are performed by conventional dynamic linkers. For example, when generating the closure file 112, the dynamic linker 108 can be configured to resolve search paths, runtime search paths (e.g., "@rpaths"), environment variables, and so on, that are specified by the software application 114. The dynamic linker 108 can also be configured to parse object files, e.g., "Mach-O" files—which can include a header region, a load command region, and a raw segment region—associated with the software application 114. Additionally, the dynamic linker 108 can be configured to perform symbol lookups in association with the software application 114. Additionally, the dynamic linker 108 can be configured to verify/register code signatures, perform address space layout randomization, perform bounds checking, and so on. In turn, the dynamic linker 108 can generate the closure file 112 based on the results of the foregoing procedures. Examples of different forms/contents of the closure file 112 are described below in greater detail in conjunction with FIGS. 2A-2D. It is noted that generating the closure files 112 out-of-process—i.e., separate from the execution environment of the software application 114—establishes an environment in which isolation can be achieved from malformed binaries, thereby enhancing overall security. Moreover, the out-of-process generation of closure files 112 can enable additional security verifications to be implemented that are not presently available when utilizing conventional dynamic linking approaches.

Additionally, as shown in FIG. 1, the dynamic linker 108 can work in conjunction with a closure file caching service 110 to manage the various closure files 112 that are generated at the computing device 102. According to some embodiments, the closure file caching service 110 can be configured to receive closure files 112 generated by the dynamic linker 108 and store the closure files 112 in one or more areas that are accessible to the software applications 114. For example, the closure files 112 for native software applications 114—e.g., the software applications 114 that ship with the OS of the computing device 102—can be stored in a shared cache (not illustrated in FIG. 1) that is accessible to the native software applications 114. According to some embodiments, the closure files 112 in the shared cache can be included with the OS when it is installed on the computing device 102 so that they are available "out-of-the box", thereby eliminating the need to generate the closure files 112 locally at each of the computing devices 102 that are manufactured and sold. For third-party software applications 114, the closure files 112 can be stored in a similar manner, e.g., in a shared cache folder specific to third-party software applications 114, in individual cache folders for each of the third-party software applications 114, in the root directory of the third-party software applications 114, and so on.

Additionally, as shown in FIG. 1, each software application 114 can access a closure file engine 116 that enables the software application 114 to execute in conjunction with its corresponding closure file 112. According to some embodiments, the closure file engine 116 can represent an extension of the dynamic linker 108 and be loaded into/execute within the memory space of the software application 114. As described in greater detail herein, the closure file engine 116—for a given software application 114—can load and validate the corresponding closure file 112, e.g., when the software application 114 is launching at the computing device 102. Additionally, the closure file engine 116 can be configured to map-in the various libraries that are relied upon by the software application 114. Moreover, the closure file engine 116 can be configured to apply various fixups (where appropriate). Finally, the closure file engine 116 can be configured to invoke various initializers that enable the software application 114 to execute at the computing device 102, e.g., by jumping to an entry point (e.g., "main( )") within the software application 114. In this regard, it is noted that the closure file 112—in conjunction with the closure file engine 116—eliminates the per-runtime tasks associated with conventional dynamic linkers (e.g., parsing object files, performing symbol lookups, etc.)—as this work was already completed by the dynamic linker 108 when generating the closure file 112. Thus, a substantial amount of the upfront work conventionally required during each launch of a given software application 114 is eliminated, thereby reducing launch-time latency and improving overall user satisfaction.

It is noted that although the various examples described herein involve a single closure file 112 for each software application 114, other approaches can be utilized without departing from the scope of this disclosure. For example, a closure file 112 for a given software application 114 can be separated into any number of closure files 112 without departing from the scope of this disclosure. Additionally, it is noted that the different components described herein can be combined and/or further-separated without departing from the scope of this disclosure. For example, the dynamic linker 108 and the closure file caching service 110 can be merged together, or split apart into additional components, without departing from the scope of this disclosure.

Accordingly, FIG. 1 provides a high-level overview of different hardware/software architectures that can be implemented by computing device 102 in order to carry out the various techniques described herein. A more detailed breakdown of these techniques will now be provided below in conjunction with FIGS. 2A-2D and 3-4.

Figure 2A:
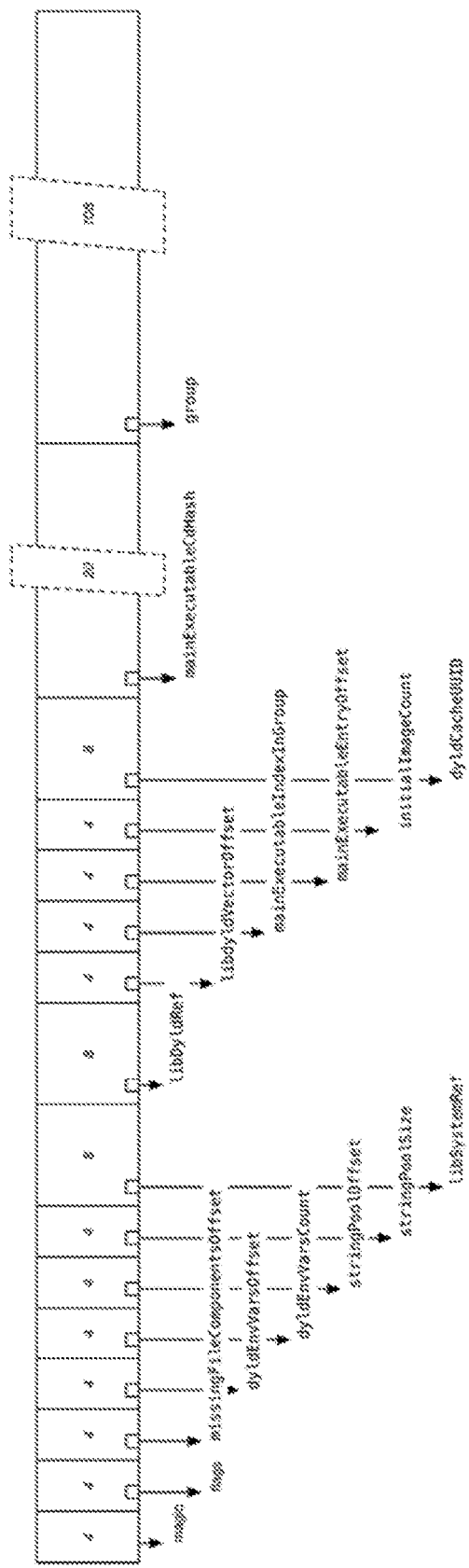

FIGS. 2A-2D illustrate conceptual diagrams of a closure file 112, according to some embodiments. In particular, FIG. 2A illustrates an example binary representation 200 of a closure file 112. As shown in FIG. 2A, the closure file 112 can include a variety of parameters that enable the closure file 112 to be utilized by the software applications 114 described herein. It is noted that the binary representation 200 of the closure file 112 illustrated in FIG. 2A is merely exemplary, and that the binary representation 200 can take any form without departing from the scope of this disclosure. Additionally, it is noted that the binary representation 200 can exclude one or more of the components shown in FIG. 2A, as well as include additional components that are not shown in FIG. 2A. Additionally, FIGS. 2B-2D illustrate an example JavaScript Object Notation (JSON) 210 of a closure file 112. For example, FIG. 2B illustrates a first portion 210-1 of the JSON representation 210 of the closure file 112. Next FIG. 2C illustrates a continuation—in particular, a second portion 210-2—of the JSON representation 210 of the closure file 112. Additionally, FIG. 2D illustrates a continuation—in particular, a final portion 210-3—of the JSON representation 210 of the closure file 112. It is noted that the JSON representation of the closure file 112 illustrates in FIGS. 2B-2D is merely exemplary, and that the closure file 112 can take any form without departing from the scope of this disclosure. Additionally, it is noted that the closure file 112 can exclude one or more of the components shown in FIGS. 2B-2D, as well as include additional components that are not shown in FIGS. 2B-2D, without departing from the scope of this disclosure.

Figure 3:
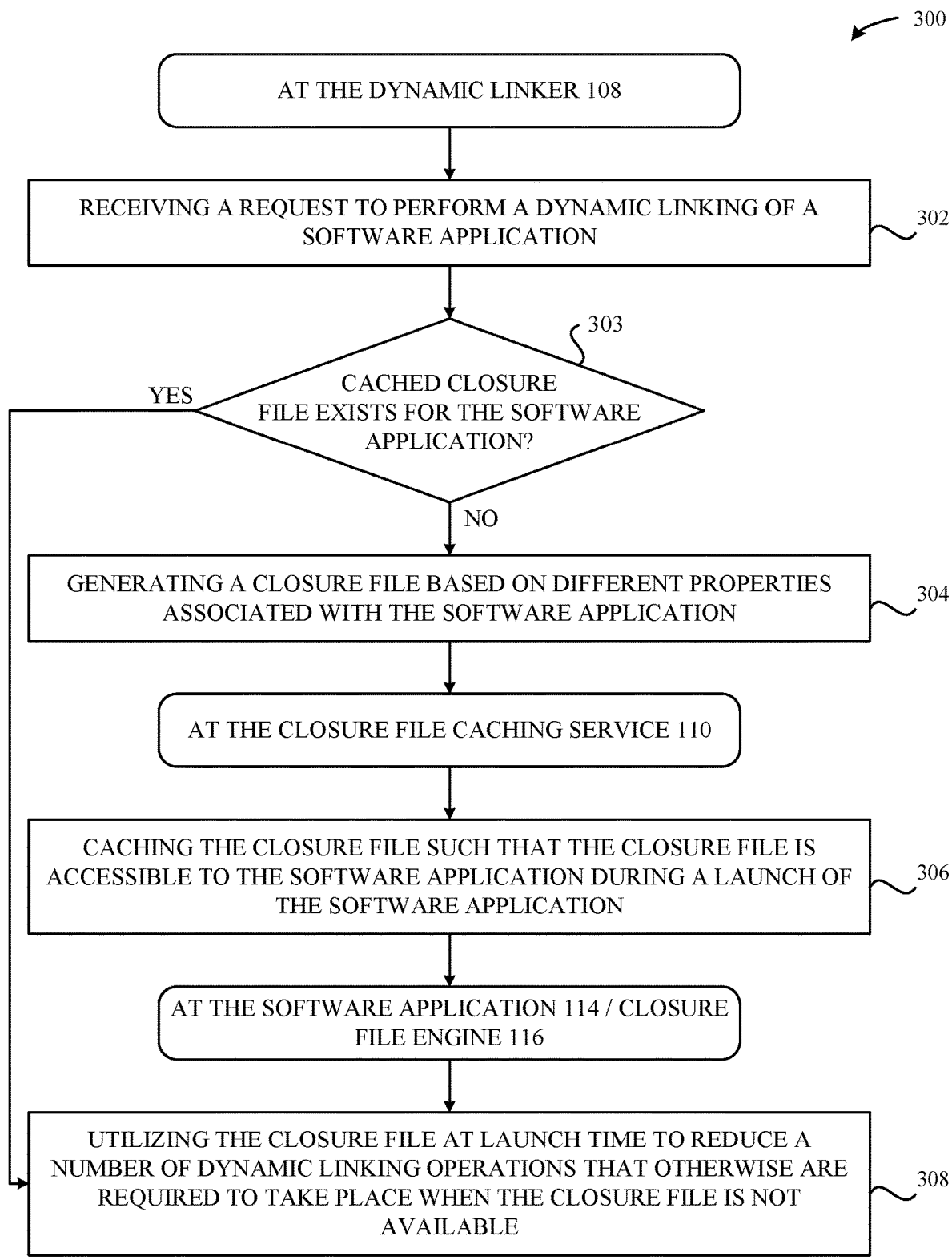
FIG. 3 illustrates a method for performing dynamic linking at a computing device, according to some embodiments.

FIG. 3 illustrates a method 300 for performing dynamic linking at the computing device 102, according to some embodiments. As shown in FIG. 3, the method 300 begins at step 302, where the dynamic linker 108 receives a request to perform a dynamic linking of a software application 114 (e.g., as described above in conjunction with FIG. 1). At step 303, the dynamic linker 108 determines whether a cached closure file exists for the software application 114. This can involve, for example, the dynamic linker 108 interfacing with the closure file caching service 110 to effectively determine whether a closure file for the software application 114 was previously-generated/cached. If, at step 303, the dynamic linker 108 determines that a cached closure file exists for the software application 114, then the method 300 proceeds to step 308, which is described below in greater detail. Otherwise, the method 300 proceeds to step 304, which is described below in greater detail.

At step 304, the dynamic linker 108 generates a closure file 112 based on different properties associated with the software application 114 (e.g., as described above in conjunction with FIG. 1). At this juncture, the dynamic linker 108 can provide the closure file 112 to the closure file caching service 110. Next, at step 306, the closure file caching service 110 caches the closure file 112 such that the closure file 112 is accessible to the software application 114 during a launch of the software application (e.g., as described above in conjunction with FIG. 1). In turn, at step 308, the software application 114/closure file engine 116 can utilize the cached closure file 112 at launch time to reduce a number of dynamic linking operations that otherwise are required to take place when the closure file is not available (e.g., as described above in conjunction with FIG. 1).

FIG. 4 illustrates a detailed view of a computing device 400 that can be used to implement the various techniques described herein, according to some embodiments. In particular, the detailed view illustrates various components that can be included in the computing device 102 described in conjunction with FIG. 1. As shown in FIG. 4, the computing device 400 can include a processor 402 that represents a microprocessor or controller for controlling the overall operation of the computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, and so on. Still further, the computing device 400 can include a display 410 that can be controlled by the processor 402 (e.g., via a graphics component) to display information to the user. A data bus 416 can facilitate data transfer between at least a storage device 440, the processor 402, and a controller 413. The controller 413 can be used to interface with and control different equipment through an equipment control bus 414. The computing device 400 can also include a network/bus interface 411 that couples to a data link 412. In the case of a wireless connection, the network/bus interface 411 can include a wireless transceiver.

As noted above, the computing device 400 also includes the storage device 440, which can comprise a single disk or a collection of disks (e.g., hard drives). In some embodiments, storage device 440 can include flash memory, semiconductor (solid state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of applications executing on the computing device 400, e.g., the dynamic linker 108, the closure file caching service 110, the software applications 114, the closure file engine 116, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for performing dynamic linking at a computing device, the method comprising, at the computing device:
   receiving a request to perform a dynamic linking of a software application in conjunction with installation of the software application;
   generating a closure file based on different properties associated with the software application, the different properties determined by the dynamic linking of the software application;
   caching the closure file such that the closure file is accessible to the software application during a launch of the software application; and
   using the closure file to reduce a number of dynamic linking operations associated with launching the software application, wherein using the closure file to reduce a number of dynamic linking operations associated with launching the software application includes loading the closure file during launch of the software application, validating the closure file, and mapping, based on the closure file, a set of dynamic libraries used by the software application.

2. The method of claim 1, wherein
   generating the closure file includes verifying a code signature, registering a code signature, performing address space layout randomization, or performing bounds checking.

3. The method of claim 1, wherein the request is additionally issued in conjunction with installing a software update to the software application or installing an operating system update to an operating system of the computing device.

4. The method of claim 1, wherein the request is issued by a security daemon executing on the computing device.

5. The method of claim 1, wherein the dynamic linking is performed in isolation from an execution environment of the software application.

6. The method of claim 1, wherein the different properties associated with the software application include at least one of runtime search paths, environment variables, object files, or symbols.

7. The method of claim 1, wherein the closure file is cached in a folder that is specific to the software application, or the closure file is cached in a shared folder that is specific to a group of software applications in which the software application is included.

8. A non-transitory computer readable storage medium configured to store instructions that, when executed by a processor included in a computing device, cause the computing device to perform dynamic linking, by carrying out steps that include:
   receiving a request to perform a dynamic linking of a software application in conjunction with installing the software application;
   generating a closure file based on different properties associated with the software application, the different properties determined by the dynamic linking of the software application;
   caching the closure file such that the closure file is accessible to the software application during a launch of the software application; and
   using the closure file to reduce a number of dynamic linking operations associated with launching the software application, wherein using the closure file to reduce a number of dynamic linking operations associated with launching the software application includes loading the closure file during launch of the software application, validating the closure file, and mapping, based on the closure file, a set of dynamic libraries used by the software application.

9. The non-transitory computer readable storage medium of claim 8, wherein
   generating the closure file includes verifying a code signature, registering a code signature, performing address space layout randomization, or performing bounds checking.

10. The non-transitory computer readable storage medium of claim 8, wherein the request is issued in conjunction with installing a software update to the software application or installing an operating system update to an operating system of the computing device.

11. The non-transitory computer readable storage medium of claim 8, wherein the request is issued by a security daemon executing on the computing device.

12. The non-transitory computer readable storage medium of claim 8, wherein the dynamic linking is performed in isolation from an execution environment of the software application.

13. The non-transitory computer readable storage medium of claim 8, wherein the different properties associated with the software application include at least one of runtime search paths, environment variables, object files, or symbols.

14. The non-transitory computer readable storage medium of claim 8, wherein the closure file is cached in a folder that is specific to the software application, or the closure file is cached in a shared folder that is specific to a group of software applications in which the software application is included.

15. A computing device configured to perform dynamic linking, the computing device comprising:
a processor; and
a memory configured to store instructions that, when executed by the processor, cause the computing device to:
receive a request to perform a dynamic linking of a software application in conjunction with installation of the software application;
generate closure file based on different properties associated with the software application, the different properties determined by the dynamic linking of the software application;
cache the closure file such that the closure file is accessible to the software application during a launch of the software application; and
use the closure file to reduce a number of dynamic linking operations associated with a launch of the software application, wherein to use the closure file to reduce a number of dynamic linking operations associated with the launch of the software application, the processor is to cause the computing device to load the closure file during launch of the software application, validate the closure file, and map, based on the closure file, a set of dynamic libraries used by the software application.

16. The computing device of claim 15, wherein
to generate the closure file includes to verify a code signature, register a code signature, perform address space layout randomization, or perform bounds checking.

17. The computing device of claim 15, wherein the request is issued in conjunction with installation of a software update to the software application or installation of an operating system update to an operating system of the computing device.

18. The computing device of claim 15, wherein the dynamic linking is performed in isolation from an execution environment of the software application.

19. The computing device of claim 15, wherein the different properties associated with the software application include at least one of runtime search paths, environment variables, object files, or symbols.

20. The computing device of claim 15, wherein the closure file is cached in a folder that is specific to the software application, or the closure file is cached in a shared folder that is specific to a group of software applications in which the software application is included.

* * * * *